United States Patent [19]

Totten

[11] 4,007,919
[45] Feb. 15, 1977

[54] FENCE STRUCTURE

[76] Inventor: Clyde D. Totten, 31557 1/2 Castaic Road, Castaic, Calif. 91310

[22] Filed: July 24, 1975

[21] Appl. No.: 598,685

[52] U.S. Cl. .................................. 256/59; 256/65
[51] Int. Cl.² .................................. B01F 13/00
[58] Field of Search .................. 256/19, 59, 65, 24

[56] References Cited
UNITED STATES PATENTS

| | | | |
|---|---|---|---|
| 3,107,900 | 10/1963 | De Paolo | 256/65 |
| 3,357,681 | 12/1967 | Souza, Jr. | 256/65 |
| 3,494,596 | 2/1970 | Bellinson et al. | 256/59 |
| 3,902,703 | 9/1975 | Bouye | 256/65 |

Primary Examiner—Werner H. Schroeder
Assistant Examiner—Doris L. Troutman

[57] ABSTRACT

A fence structure in which the rails are hollow members having a generally rectangular cross-sectional configuration. Special features of the hollow rail include rigid foam plastic material filling its interior; interfitting tongue and groove means formed on the upper and lower walls of the rail; and/or the upper wall of the rail being open so that its interior may be filled with an earth material. The invention is particularly directed toward portable fence structures used for horses.

3 Claims, 14 Drawing Figures

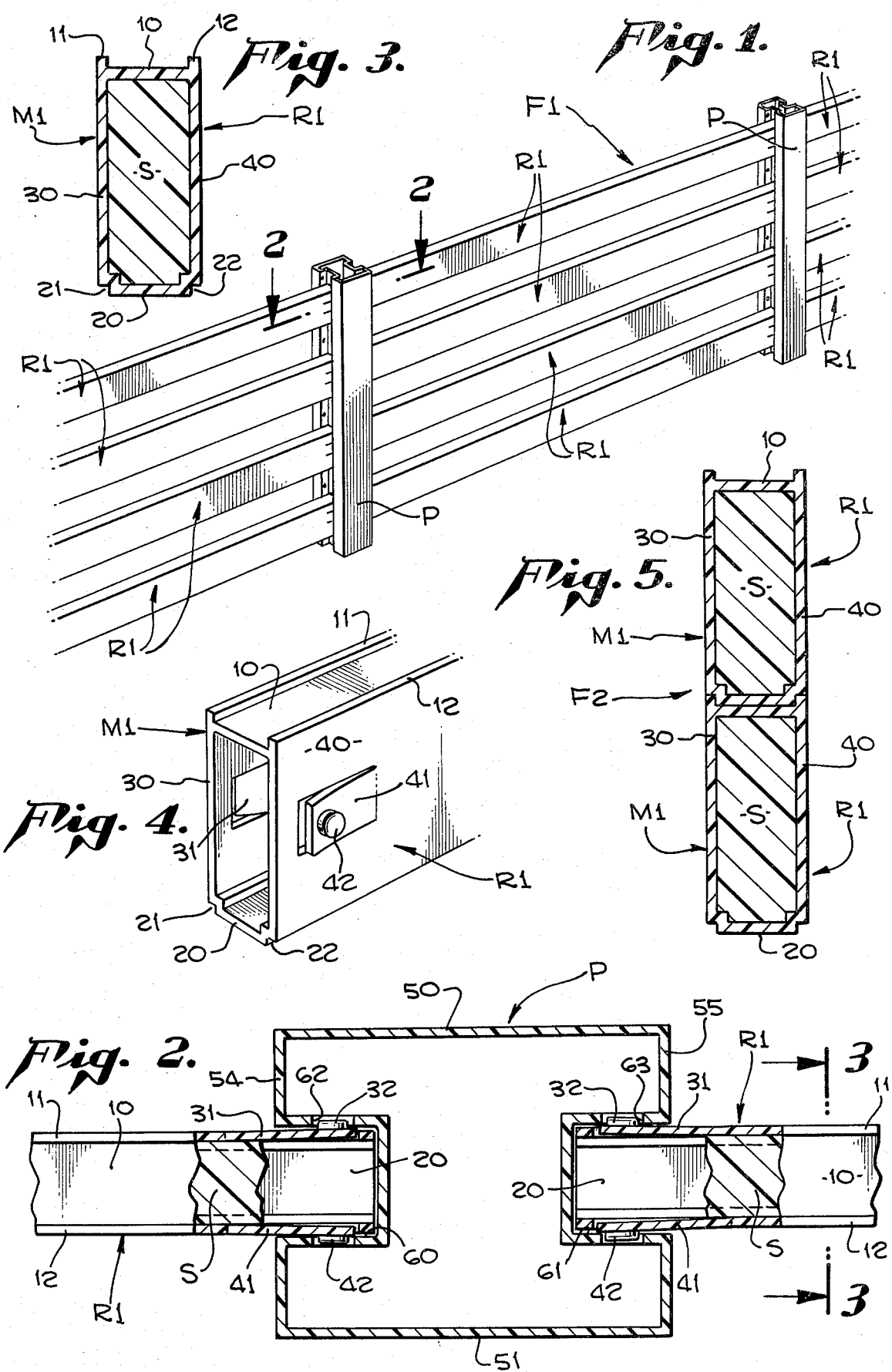

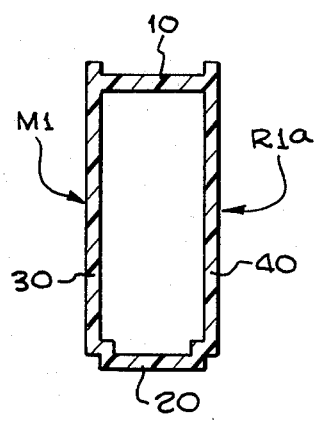
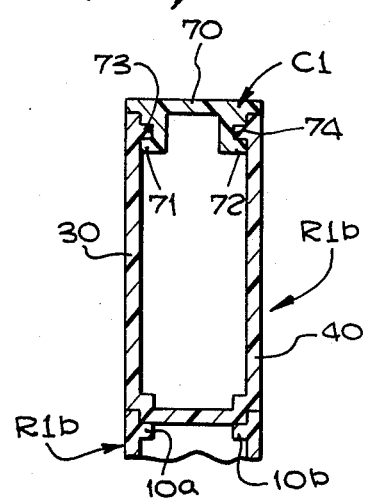
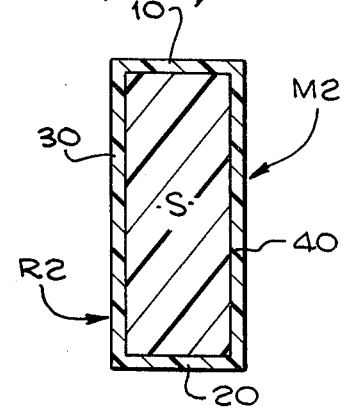
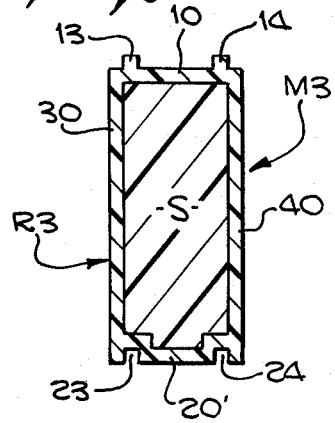
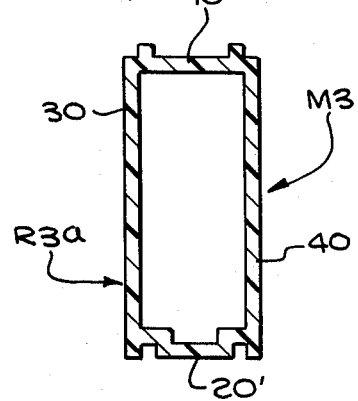
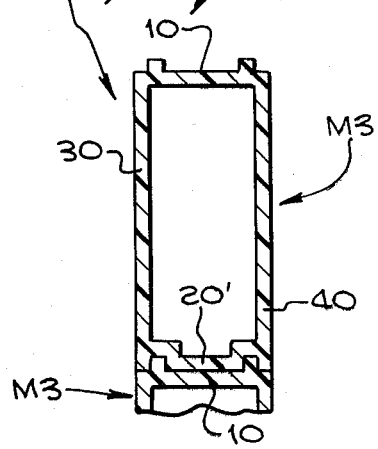
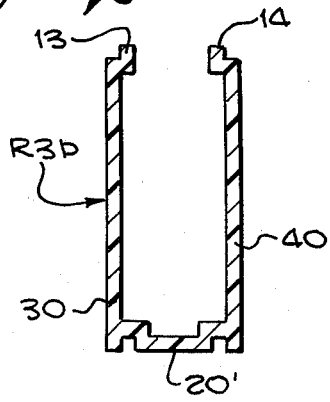
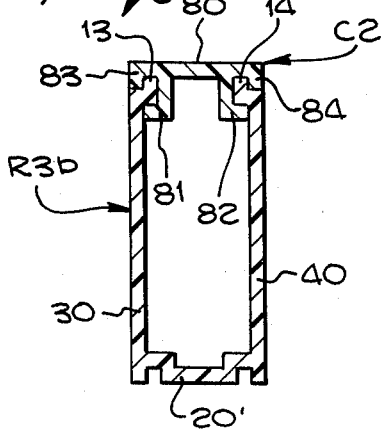
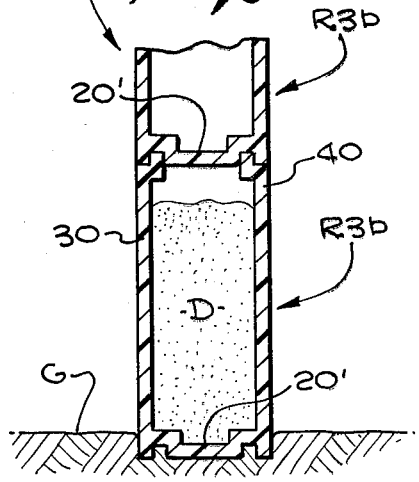

4,007,919

FENCE STRUCTURE

BACKGROUND OF THE INVENTION

Portable fence structures used for containing horses within a specified area present some unique problems of design and construction. The rails and posts must be resistant to chewing by the animals. For portability the structure must be easily assembled and disassembled. In a portable fence structure there is also a problem of providing enough weight to make a strong fence; the heavier and hence stronger the structure is made, the more difficult it is to transport.

SUMMARY OF THE INVENTION

According to the present invention a fence structure is provided which has hollow rails. The hollow rails are preferably extruded from either metal or plastic material. The fence structure is modular and can be easily assembled or disassembled.

In one form of the invention the interior of the hollow rail is filled with a rigid foam plastic material, bonded to the interior wall surfaces of the hollow member, and providing a composite structure of considerable strength as well as light weight.

In another form of the invention the upper and lower walls of the rails are provided with interfitting tongues and grooves, whereby the rails may be superimposed in a vertical series and will be interlocked.

In still another form of the invention the hollow rail is made open at the top, and the portable fence structure is constructed by resting the lowermost rail upon the ground and at least partially filling its interior with an earth material.

The object and purpose of the invention, therefore, is to provide a fence structure which is lightweight, yet strong and durable, and easily assembled or disassembled.

DRAWING SUMMARY

FIG. 1 is a perspective view of a fence constructed in accordance with the present invention;

FIG. 2 is a horizontal cross-sectional view taken on the line 2—2 of FIG. 1;

FIG. 3 is a cross-sectional view taken on line 3—3 of FIG. 2;

FIG. 4 is a perspective view of the end of one of the rails of FIG. 1;

FIG. 5 is a cross-sectional view of an alternate fence structure using the same rails as the fence of FIG. 1;

FIG. 6 is a cross-sectional view of a modified form of the rail of FIG. 1;

FIG. 7 is a cross-sectional view of a fence structure incorporating an open-topped version of the rail of FIG. 1;

FIG. 8 is a cross-sectional view of yet another form of rail structure;

FIG. 9 is cross-sectional view of still a different type of rail structure;

FIG. 10 is a cross-sectional view of a modified form of the rail of FIG. 9;

FIG. 11 is a cross-sectional view of a fence structure incorporating the rail of FIG. 10;

FIG. 12 is a cross-sectional view of an open topped version of the rail of FIG. 10;

FIG. 13 is a cross-sectional view of the rail of FIG. 12 when capped; and

FIG. 14 is a partial cross-sectional view of a portable fence structure incorporating the rail of FIG. 12.

ILLUSTRATED EMBODIMENTS

Reference is now made to the drawings which illustrate several embodiments of the invention.

A first embodiment is illustrated in FIGS. 1 through 4, inclusive. A fence F1 includes posts P and rails R1. The rail and post will first be described individually, and then the resulting fence structure will be described.

Rail R1 (FIGS. 3 and 4) includes a hollow member M1 of generally rectangular cross-sectional configuration, and having top, bottom and side walls of generally uniform thickness. The rail is typically about two inches wide and about four inches high, and hence the top wall 10 and bottom wall 20 each has a horizontal dimension of about two inches while the side walls 30 and 40 have a vertical dimension of about four inches. Member M1 also includes a pair of tongues 11, 12 provided on its top wall 10 and a pair of grooves 21, 22 provided in its bottom wall 20. The location and configuration of the tongues and grooves is such that one rail R1 may be superimposed upon another as shown in FIG. 5, and the tongues of the underneath rail are then received in the grooves of the upper rail. Specifically, in member M1 the tongues 11, 12 are formed essentially as extensions of the respective side walls 30, 40 while the grooves 21, 22 are notches removed from the lower corners of the member.

Member M1 is filled with a rigid foam plastic filler S (FIGS. 2 and 3) which fills the entire length of the member except its end portions. Filler S is bonded to the interior wall surfaces of member M1. Filler S may typically be a polyurethane material, or polystyrene.

As best seen in FIG. 4, member M1 has near each of its ends a pair of laterally movable panels formed in its side walls. Thus a U-shaped cut is made in the side wall 30 with its open end adjacent to the end of the rail, to form a panel 31 which can swing outward from the side wall. In similar fashion a panel 41 formed from side wall 40 can swing outwardly therefrom. An outwardly extending ear or peg 42 is attached to the panel 41, and a similar ear or peg 32 is attached to panel 31. The panels 31, 41 and pegs 32, 42 are used for securement of the rails to the posts, as later described.

Each of the hollow members M1 is preferably integrally formed as an extrusion, and may suitably be made of a metal such as aluminum, or of a plastic material such as polyvinyl chloride or polycarbonate. Other materials suitable for extrusion may also be used. Alternatively, the hollow member may be fabricated by a process other than extrusion.

The filler S cooperates with member M1 to provide a structural member of considerable strength and rigidity. This result is achieved because of the rigidity of the filler material, and its bonding to the interior wall surfaces of member M1.

Post P, as best seen in FIG. 2, is also made as a hollow extrusion. Post P is of generally rectangular configuration having side walls 50, 51, and end walls 54, 55. The end walls are depressed inwardly to form respective rectangular grooves 60, 61. The side walls of groove 60 have hole pairs 62 formed therein while the side walls of groove 61 have hole pairs 63 formed therein.

In the completed fence F1 as shown in FIGS. 1 and 2 the elevation of each rail R1 is such as to correspond with one of the hole pairs 62 and one of the hole pairs 63. Thus as shown in FIG. 2 each rail end is received in one of the post grooves in abutting relationship therewith. The pegs 32, 42 on the end of one rail R1 are received in a hole pair 62 while the pegs 32, 42 on the end of another rail R1 are received in a hole pair 63.

FIG. 5 shows another form of fence structure F2 which, however, uses the same rails R1 as the first embodiment. One rail is superimposed on another with the tongues and grooves in an interlocking relationship.

FIG. 6 illustrates a rail R1a which is the same as rail R1, except for omission of filler material S. Rail R1a therefore consists only of the hollow member M1.

FIG. 7 illustrates a further modified type of rail R1b, and a fence structure fabricated therefrom. Rail R1b is constructed the same as rail R1a except that the greater portion of the top wall 10 is omitted. Thus a pair of relatively short horizontal flanges 10a, 10b project inwardly from the respective side walls 30 and 40. The remainder of the top wall is omitted. As clearly seen in FIG. 7 the rails R1b may be superimposed in interlocking relationship, just as effectively as rails R1 of FIG. 5. A lid or zipper C1 is used to close the otherwise open top of the upper most one of the rails R1b.

Lid or cap C1 is also in the form of an extrusion, having a flat top wall 70 from which a pair of longitudinally extending legs 71, 72 depend downwardly. The legs are spaced inwardly from the lateral edges of the top wall 70 so that the tongues 11 and 12 (extensions of side walls 30 and 40) may be received in abutting relationship with the undersurfaces of the top wall 70. Leg 71 in its outer wall surface has a horizontally extending groove 73 which receives the flange 10a of the rail R1b. In similar fashion the leg 74 has a longitudinally extending groove 72 in its outer wall surface which receives the flange 10b.

FIG. 8 illustrates a rail R2 in accordance with the present invention, consisting of a hollow member M2 with filler material S. Member M2 includes top wall 10, bottom wall 20, and side walls 30, 40 and has the same general configuration as member M1 except for the omission of the tongues and grooves. Member M2 is preferably made from a plastic material such as polyvinyl chloride or polycarbonate. The filler material S, as in the prior embodiment, is a rigid foam plastic filler and is bonded to the interior walls of the member M2.

FIG. 9 illustrates yet another rail R3 in accordance with the present invention. Rail R3 includes a hollow member M3 and filler material S. Member M3 includes top wall 10, bottom wall 20' and side walls 30, 40, all of which may be identical to the corresponding walls of member M1, except for bottom wall 20'. Tongues 13, 14 formed on the upper surface of the top wall 10 are not located at the corners of the rail, but are set inwardly so that they commence just above the inner edges of the side walls 30, 40, respectively. Grooves 23, 24 formed in the undersurface of bottom wall 20 are also not located at the rail corners, but are set inwardly so that they commence at the inner surfaces of the side walls 30, 40, respectively. The different location of grooves 23, 24 from the grooves 21, 22 of the first embodiment accounts for the slightly different configuration of bottom wall 20' from the bottom wall 20.

FIG. 10 illustrates a modified rail R3a which is identical to rail R3 of FIG. 9 except for the omission of filler material S. That is, it consists only of the hollow member M3 which was previously described.

FIG. 11 illustrates a fence F4 which is constructed by arranging a plurality of the rails R3a in vertical sequence, one superimposed on another. Thus, the tongues 13, 14 of the underneath rail are received by the grooves 23, 24 of the superimposed rail to form an interlocking relationship.

FIG. 12 illustrates a rail R3b which is the same as rail R3a except for the upper wall being left open. That is, in rail R3b all of that portion of the top wall 10 lying between the tongues 13, 14, is omitted. FIG. 13 illustrates a top cap C2 which is fitted on top of rail R3b to enclose its upper edge. Cap C2 is formed as an extrusion having a horizontal wall 80 from which a pair of longitudinally extending legs 81, 82 depend downwardly. The legs 81, 82 are set inwardly from the lateral edges of the wall 80 by twice the thickness of one of the side walls 30 or 40. Each of these depending legs, after extending downwardly by twice the thickness of wall 30 or 40, is then flanged outwardly. Additional flanges 83 and 84 extend downwardly underneath the outer edges of the wall 80. The side walls 30, 40 of rail R3b engage the outer edges of the flanges of legs 81, 82, respectively. Tongue 13 is received between flange 83 and leg 81, while tongue 14 is received between flange 84 and leg 82 of the cap.

Reference is made to FIG. 14 illustrating a fence F5 which is constructed utilizing the rails of FIGS. 12 and 13. Only the lowermost rail, and a small portion of the next superimposed rail, are shown. The lowermost rail R3b rests upon ground G. A large portion of its interior is filled with dirt D. This construction is conveniently used for portable corrals and the like. The hollow rails and posts are transported to the location where the fence or corral is to be constructed. In each fence section, the lowermost rail is either partially or entirely filled with dirt or other earth material and is then rested upon the ground as shown. The earth material in the bottom rails not only adds strength to these bottom rails, but also provides a weight or ballast for holding the posts securely against the ground. The superimposed rails are then held in place by means of their securement to the posts. The dirt or other earth material may be obtained at the construction site and need not be transported any great distance. When the corral or fence is to be removed, it is disassembled and the dirt or earth material is simply left there at the site and does not need to be transported away with the fence structure.

ALTERNATE FORM

While the present disclosure has been directed mainly to a fence structure, it will nevertheless be apparent that the rail structures herein illustrated may be used for other structural purposes. In particular, each of the rails R1, R2, R3, with its hollow member and rigid foam plastic filler bonded to the interior walls thereof, provides a structural member of significant rigidity and strength which may be used for a variety of structural purposes.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:
1. A fence structure comprising:
    a vertically disposed post having a vertically extending groove formed in one edge surface thereof and extending for substantially the length of said post, the configuration of said groove in the horizontal plane being substantially rectangular;

a plurality of horizontally disposed rails arranged in a vertical series, each of said rails being of substantially rectangular cross-sectional configuration both in the horizontal plane and in the vertical plane, one end of each of said rails extending into said post groove in abutting relationship therewith, said rails being hollow, the walls of said rails being made of plastic material, and a rigid plastic foam material filling the interiors of said rails and being bonded to the inner walls of said rails;

said post having a plurality of pairs of openings formed therein, on opposing sides of said groove, at least one pair of openings for each of said rails; and each of said rail ends having in its lateral walls a pair of laterally movable panels, each of said panels having an outwardly projecting ear which is received by a corresponding opening of said post groove.

2. A portable fence structure comprising a plurality of vertically extending posts, a plurality of horizontally extending rails, said rails being arranged one above another in a vertical sequence, each of said rails being hollow with a generally channel-shaped cross-sectional configuration, at least one of said rails being filled with rigid plastic foam which foam is bonded to said inner walls of said rail but with the upper and lower corners thereof being adapted for mating interengagement;

the lowermost one of said rails having its bottom side resting upon the ground, and the otherwise hollow interior thereof being at least partially filled with an earth material.

3. A composite structural fence member comprising:

an integrally formed elongated hollow member made of plastic material and having a generally rectangular cross-sectional configuration; and rigid foam plastic material filling the interior of said hollow member;

said foam plastic material being bonded to the inner wall surfaces of said hollow member and cooperating with said hollow member to provide a relatively strong load-supporting structure;

the top and bottom walls of said structural fence member having tongue and groove means integrally formed thereon, whereby an identical structural member superimposed upon said top wall may be interlocked therewith.

* * * * *